(12) United States Patent  
Stucchi et al.

(10) Patent No.: US 8,984,204 B2  
(45) Date of Patent: Mar. 17, 2015

(54) COMMUNICATION NETWORK FOR A LOW VOLTAGE ELECTRIC SWITCHBOARD

(75) Inventors: Marco Stucchi, Osio Sotto (IT); Riccardo Panseri, Bergamo (IT); Paolo Gritti, Cenate Sopra (IT)

(73) Assignee: ABB S.p.A., Milan (IT)

( * ) Notice: Subject to any disclaimer, the term of this patent is extended or adjusted under 35 U.S.C. 154(b) by 359 days.

(21) Appl. No.: 13/499,163

(22) PCT Filed: Sep. 21, 2010

(86) PCT No.: PCT/EP2010/063863
§ 371 (c)(1),
(2), (4) Date: Mar. 29, 2012

(87) PCT Pub. No.: WO2011/039074
PCT Pub. Date: Apr. 7, 2011

(65) Prior Publication Data
US 2012/0185630 A1    Jul. 19, 2012

(30) Foreign Application Priority Data
Sep. 30, 2009    (IT) .............................. BG2009A0051

(51) Int. Cl.
*G06F 13/36*    (2006.01)
*G06F 13/14*    (2006.01)
(Continued)

(52) U.S. Cl.
CPC ......... *H02H 1/0061* (2013.01); *G06F 13/4027* (2013.01); *H02H 7/261* (2013.01);
(Continued)

(58) Field of Classification Search
USPC ......... 710/300, 105–106, 110, 305–306, 311, 710/312; 700/22, 286, 292, 297; 726/2–3, 726/21, 27–29
See application file for complete search history.

(56) References Cited

U.S. PATENT DOCUMENTS 4,811,332 A * 3/1989 Carse ............................ 370/364
5,754,804 A * 5/1998 Cheselka et al. .............. 710/305
(Continued)

FOREIGN PATENT DOCUMENTS

DE    102007004943 A1    7/2008
EP       1976177 A1   10/2008
JP      2007-151394 A    6/2007

OTHER PUBLICATIONS

"MNS iS Motor Control Center". System Guide. System Release 1.5/0. 2006. ABB Automation Products GmbH.*
Heberlein, Jr. et al. "Great Things in Dense Packages". IEEE Industry Applications Magazine. Jul./Aug. 2006. pp. 44-52.*
Chinese Office Action dated Sep. 17, 2014.
"MNS iS Motor Control Center". System Guide. System Release 1.5/0. 2006, ABB Automation Products GmbH.

*Primary Examiner* — Thomas J Cleary
(74) *Attorney, Agent, or Firm* — Novak Druce Connolly Bove + Quigg LLP

(57) ABSTRACT

A communication network for a low-voltage switchboard comprising three types of communication bus.
The first communication bus is designed to provide a first communication channel with at least one electronic protection device.
A second communication bus is designed to provide a second communication channel with said electronic protection device.
At least one third communication bus (13) is designed to provide a third communication channel between said at least one protection and control unit and one or more additional electronic modules (6A, 6B, 6C, 6E, 6F).
The second communication bus is associated with a second, higher user access level than the first user access level associated with said first communication bus.

20 Claims, 3 Drawing Sheets

(51) Int. Cl.
    *G05B 11/01*    (2006.01)
    *G06F 13/40*    (2006.01)
    *H02H 1/00*    (2006.01)
    *H02H 7/26*    (2006.01)
    *H02J 13/00*    (2006.01)

(52) U.S. Cl.
    CPC ........... *H02J 13/0062* (2013.01); *Y02E 60/723* (2013.01); *Y04S 10/16* (2013.01); *Y04S 10/20* (2013.01); *Y02E 60/725* (2013.01); *Y02B 90/2638* (2013.01); *Y04S 40/124* (2013.01); *Y02E 60/7838* (2013.01)
    USPC ............. 710/312; 710/305; 710/306; 700/22

(56) References Cited

U.S. PATENT DOCUMENTS

| | | | |
|---|---|---|---|
| 6,137,776 | A | 10/2000 | Bauerschmidt et al. |
| 6,880,034 | B2 * | 4/2005 | Manke et al. ................. 710/306 |
| 2006/0109611 | A1 * | 5/2006 | Lang et al. ..................... 361/605 |
| 2006/0212633 | A1 * | 9/2006 | Kasper ........................... 710/260 |
| 2007/0168746 | A1 * | 7/2007 | Righi et al. ...................... 714/38 |
| 2009/0257345 | A1 * | 10/2009 | King ............................. 370/216 |

* cited by examiner

COMMUNICATION NETWORK FOR A LOW VOLTAGE ELECTRIC SWITCHBOARD

CROSS REFERENCE TO RELATED APPLICATIONS

This application is a National Phase filing under 35 U.S.C. §371 of PCT/EP2010/063863 filed on Sep. 21, 2010; and this application claims priority to Application No. BG2009A000051 filed in Italy on Sep. 30, 2009, under 35 U.S.C. §119; the entire contents of all are hereby incorporated by reference.

The present invention relates to the field of low-voltage switchboards. More in particular, the present invention refers to a communication network for low-voltage switchboards.

It is common knowledge that low-voltage switchboards (i.e. for voltages lower than 1 kV AC or 1.5 kV DC) comprise switching devices designed to enable the proper operation of specific sections of a installation and of the related electrical loads. These switching devices comprise one or more electrical poles, associated with each of which there are at least one fixed contact and one mobile contact, mutually couplable/uncouplable by means of the operation of suitable control means. Generally speaking, the above-described switching devices are operatively associated with electronic protection devices (also known as "electronic protection relays"). The main technical purpose of these devices is to regulate the operation of the switching devices and to obtain information relating to the operating status of the electrical installation. In practice, they are capable of recording the operating conditions of an electrical installation by means of suitable sensors and of generating commands designed to prompt the intervention of corresponding switching devices in the event of failures or overloads. In addition to serving above-mentioned purposes of control and operation, electronic protection devices can provide complementary information relating to the operating status of the electrical installation.

They are capable of providing sophisticated sets of data that can be advantageously processed to obtain structured information concerning one or more electrical lines, such as the frequency of the network, the amplitude of the currents or the phase voltages (providing these data in real time, or as statistics, recorded at the time of a failure, for instance), or the sequential number of a failure, of an anomaly or of an action taken, the current or power rating when the circuit was broken, and so on. A low-voltage switchboard generally includes a communication network designed to enable data/signals to be exchanged between electronic protection devices and the outside environment, and between different electronic protection devices.

Traditionally, such a communication network comprises a principal communication bus (also called a system bus), the main purpose of which is to provide a channel for communications with the electronic protection devices.

The system bus is used to coordinate the operative functioning of the electronic protection devices and to acquire the data provided by the latter.

For instance, the system bus can be used by the switchboard operator to perform monitoring procedures on the operating status of an electrical line or to configure the operating parameters of the electronic protection devices.

The aforesaid system bus traditionally implements communication modalities of the "master-slave" type, according to which the initiative for communication is taken by a device, such as a peripheral electronic device, for instance, or a supervisor and control system, that interrogates/activates the electronic protection device of interest (slave), with which it wishes to communicate, by means of a suitable interface made available by the latter's control and protection unit.

Generally speaking, the communication network of a switchboard is also developed at local level, i.e. at the level of each electronic protection device.

The protection and control unit of an electronic protection device may be operatively connected, by means of a so-called "local bus", to additional electronic modules designed to implement additional functionalities.

Communication between the protection and control unit and the additional electronic modules is also typically based on a "master-slave" modality. The protection and control unit generally has a "slave" port available for the additional electronic modules that act as "masters".

Experience has shown that the communication networks of known type have several drawbacks.

At system bus level, these drawbacks consist in a limited flexibility in use, because integrating a "slave" interface in the protection and control unit restricts the types of bus that can feasibly be used.

This often makes it impossible to fully satisfy the user's requirements, which can vary and be diversified depending on installation or other needs.

Moreover, because the system bus is part of the communication network that is often subject to market demand for changes and adaptations, any rigidity in the type of system bus available can be a factor responsible for the early obsolescence of the product on offer and even an obstacle to its saleability.

Another drawback derives from the implementation of "master-slave" communication modalities in the system bus. Only one "master" device can be connected at a time to the "slave" interface provided by the protection and control unit, with obvious limitations in the data transfer rate.

Similar drawbacks are encountered at local bus level too: the "slave" port provided by the protection and control unit can be operatively connected to only one of the additional modules that serve as "masters" at any given time.

A commonly adopted solution to enable a larger number of additional modules to be operatively connected to the protection and control unit consists in providing a further electronic module with two "master" ports between the protection and control unit and the additional modules. This further electronic module is designed to manage communication between the protection and control unit and the additional modules by means of a "polling" system for sorting the information in transit.

It has been ascertained, however, that although solutions of this type undoubtedly represent a step forward in relation to the more conventional communication networks, they do not enable the above-described drawbacks to be convincingly overcome.

In fact, using a "polling" system to manage the information in transit has the drawback of limiting, or making non-deterministic, the performance of the local bus when the number of electronic modules connected thereto increases.

The local bus thus becomes inadequate for use as infrastructure for protection and control functions that demand deterministic reaction times.

These functions, be they inside a given protection and control unit or shared between several protection and control units (selectivity, interlocks, automation, and so on) are currently managed by means of dedicated input/output electrical signals.

Another drawback of currently-available communication networks is generally represented by their limited flexibility in use, particularly as concerns the communication buses.

In fact, every change made to the switchboard's functions demands a dedicated wiring action. In addition, the currently-used hardware resources also impose considerable restrictions on the number and types of function that can be implemented inside the switchboard.

Thus, the main technical aim of the present invention is to produce a communication network for a low-voltage switchboard that enables the previously-described limits and drawbacks to be overcome or reduced.

Within the context of this aim, one object of the present invention is to produce a communication network that ensures a performance of deterministic type, capable of meeting the data/signal communication needs from/to and between the electronic protection devices in a satisfactory manner, even when the number of electronic devices/modules connected to the communication network increases.

Another object of the present invention is to produce a communication network that is highly flexible in use and that enables the user to modify the switchboard layout by means of the quick and easy installation of additional electronic modules.

A further object of the present invention is to produce a communication network that is easy, quick and flexible to prepare and install in the switchboard at a relatively limited cost.

This technical aim, and these and other objects that will emerge more clearly later on, are achieved by a communication network for low-voltage switchboards according to claim 1 below.

According to a general definition, the communication network according to the invention comprises three distinct communication buses.

A first and a second communication bus are designed to provide several communication channels for accessing the electronic protection devices from outside the switchboard.

The first and second communication buses are associated with differentiated user access levels to enable the user to select who is qualified to become connected to each of the communication buses.

The first communication bus, hereinafter called the "system bus" for the sake of brevity, is associated with a first, lower user access level.

The system bus can thus be used to perform monitoring procedures on the status of the network and electronic protection devices, and also procedures to configure said devices.

The second communication bus, hereinafter called the "switchboard bus" for the sake of brevity, is associated instead with a second, higher user access level.

The switchboard bus can thus be used to place several protection and control units in communication with one another, and to perform specific automation and coordination functions.

Thanks to its separation from the system bus, on which the load may vary (being, by definition, decided by the user), the switchboard bus can operate in known conditions, with a performance of deterministic type.

This makes it possible, at switchboard bus level, to implement control functions previously achieved by means of dedicated wiring, such as selectivity functions for instance.

The rapid and guaranteed response times of the switchboard bus enable the protection and control units connected thereto to share input/output signals and to implement automation logic of the PLC ("Programmable Logic Controller") type.

The presence of a dedicated digital bus enables the protection and control units connected thereto to share articulated information that enables complex functions to be implemented, such as for monitoring the electrical network, coordinating the tripping of switching devices in the switchboard, or implementing control strategies to improve the management of electrical loads.

The system and switchboard buses are associated with at least one third communication bus, hereinafter called the "local bus" for the sake of brevity, that is designed to place the protection and control unit of at least one electronic protection device in the switchboard in communication with one or more additional electronic modules, designed to integrate/extend the functions of the protection and control unit concerned.

The local bus is advantageously designed to guarantee the maximum connection flexibility and expandability. For this purpose, it is preferably a bus of the "multi-master" type capable of automatically managing the priorities of the messages in transit.

These characteristics make it possible to ensure a performance of deterministic type, avoiding the need for a "polling system" and enabling the connection of additional devices according to need.

The whole data exchange architecture of the electronic protection device is advantageously based on the local bus, which constitutes the only available communication interface for the protection and control unit.

All the additional electronic modules designed to expand the functions of the protection and control unit advantageously come to bear on the local bus.

The above-described system bus and switchboard bus preferably communicate with the local bus, and consequently with the protection and control unit, by means of suitable electronic communication modules that function advantageously as "gateways".

This enables the previously-described drawbacks relating to the system buses commonly used in the communication networks of known type to be overcome.

In fact, it thus becomes possible to provide for as many electronic communication modules as there are types of system bus that the user wishes to make available for their implementation, leaving users free to select the solution best suited to their needs.

The communication network according to the present invention offers considerable advantages over the known state of the art.

Thanks to a structure that comprises three differentiated communication buses, with different user access levels, the communication network according to the present invention enables a sharing of the data/signal flows from/to and between the electronic protection devices, thereby ensuring a constantly high performance even in the event of high traffic volumes.

The communication network according to the present invention is characterized by a great flexibility in use, from both the structural and the functional standpoint.

As a result, it can effectively support switchboard modifications/extensions inasmuch as concerns its physical layout and/or operative functions without any need for complicated rewiring measures.

The communication network according to the present invention has a relatively simple physical structure, that is quick, easy and flexible to prepare and install in the switchboard at a relatively limited cost, avoiding or reducing, for instance, any need for dedicated wiring.

Further characteristics and advantages will emerge more clearly from the description of preferred, but not exclusive embodiments of the user interface device according to the invention, of which non-limiting examples are shown in the attached drawings, wherein.

Figure 1:
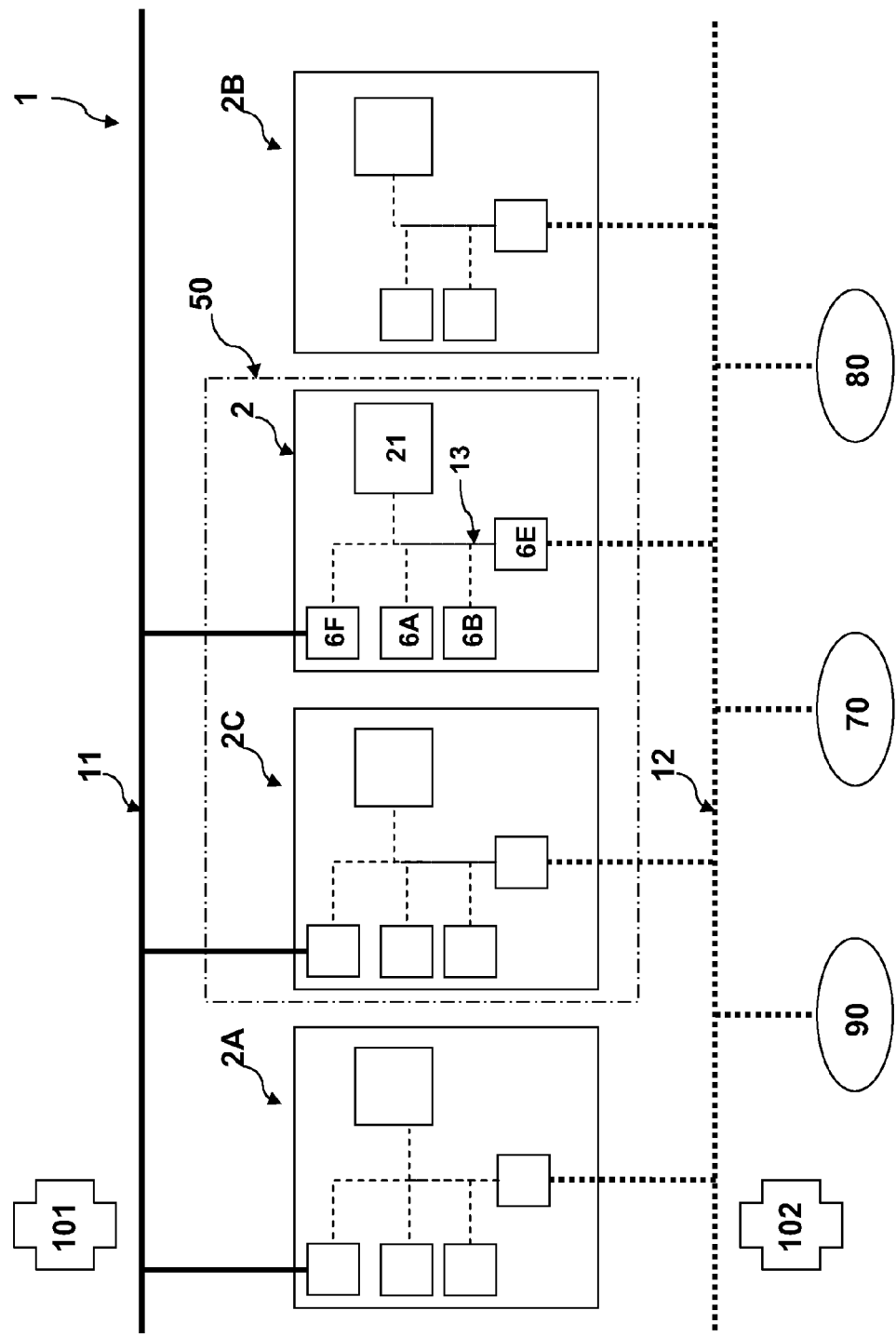
FIG. 1 is a schematic view of the structure of the communication network according to the invention.

With reference to the above-mentioned figures, the present invention refers to a communication network 1 for a low-voltage switchboard 50.

The switchboard 50 comprises at least one electrical switching device 3, operatively connected to an electronic protection device 2.

The above-mentioned electrical switching device 3 may consist, for instance, of a moulded-case, open, modular or any other type of electrical circuit breaker.

The switchboard 50 may advantageously include other electrical switching devices (not shown), some of which may be operatively associated with corresponding electronic protection devices, such as the device 2C.

On the outside of the switchboard 50, there may be further switching devices (not shown), some of which may be operatively associated with electronic protection devices, such as the devices 2A and 2B.

The electronic protection device 2 preferably comprises a protection and control unit 21, that is advantageously designed to control the functioning of the switching device 3 and/or to acquire data/information relating to the operating status of the electrical line (not shown), on which the switching device 3 is designed to take effect.

Figure 2:
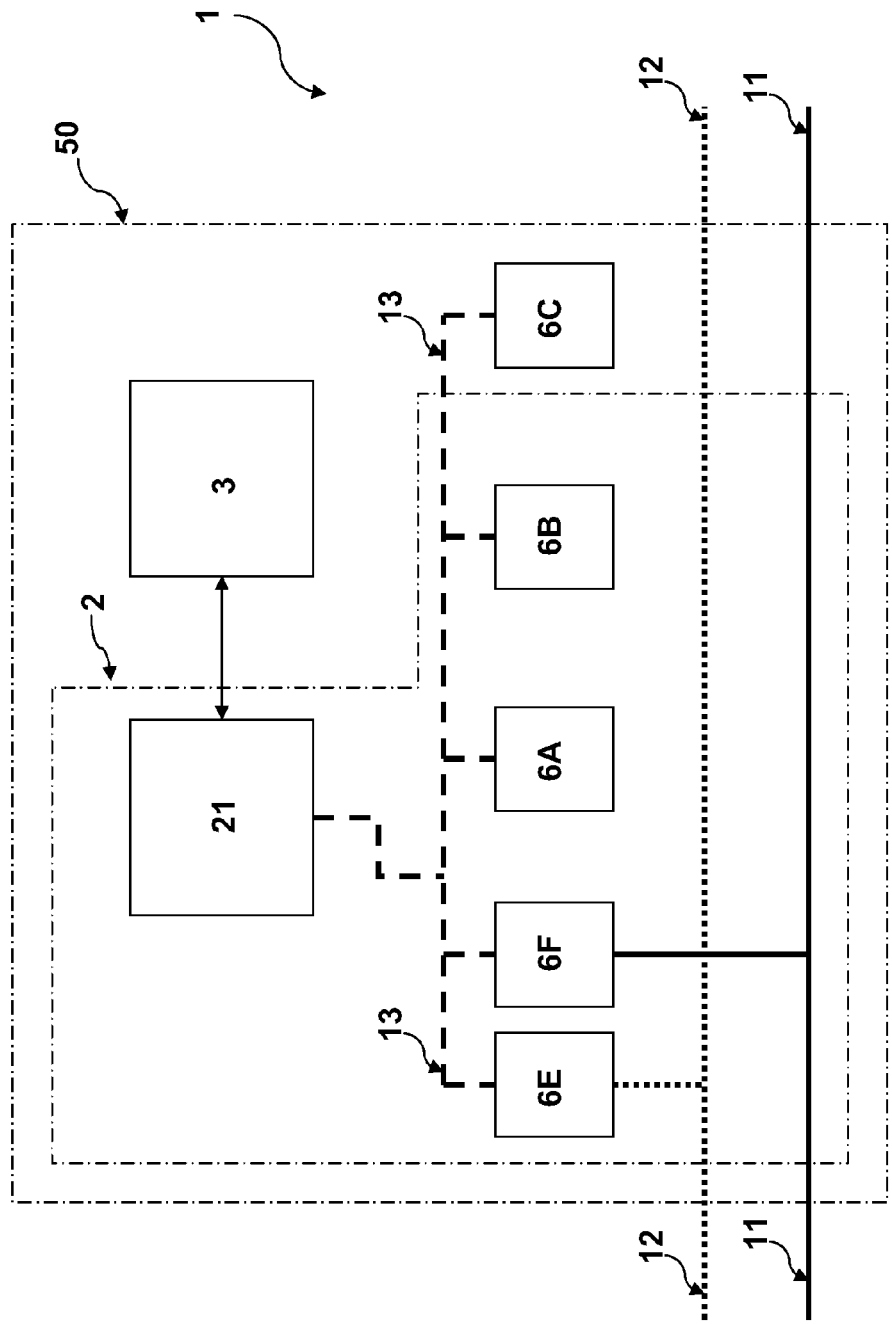
FIG. 2 is a schematic view of a switchboard containing the structure of the communication network according to the invention.
Figure 3:
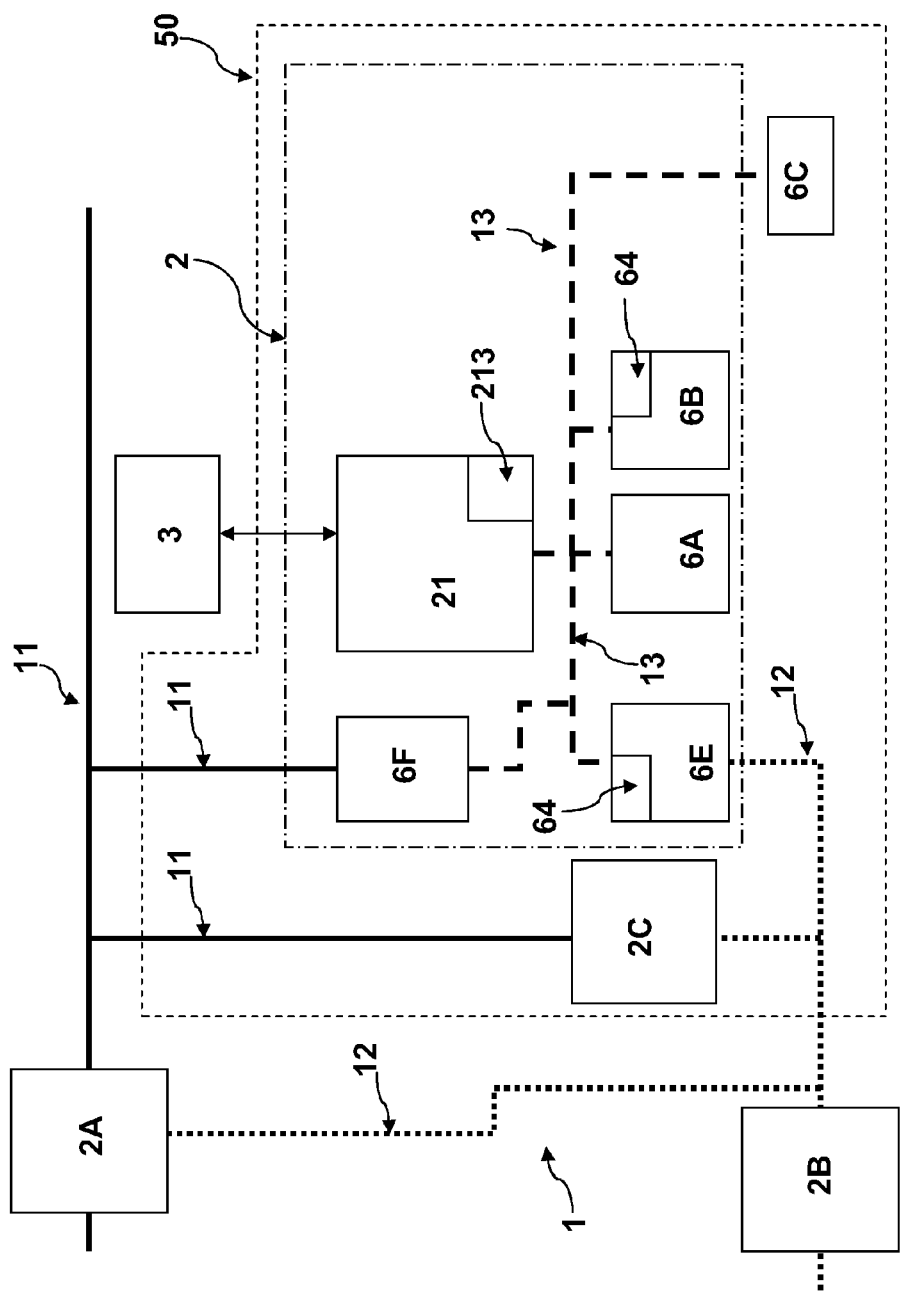
FIG. 3 is a another schematic view of a switchboard containing the structure of the communication network according to the invention.

The communication network 1 comprises a first communication bus 11 (the "system bus"), designed to provide a first communication channel with the electronic protection device 2. The system bus 11 can advantageously connect several electronic protection devices 2, 2A, 2B and 2C, located inside or outside the switchboard 50, as shown in FIGS. 1-2. The system bus 11 preferably implements a communication protocol of the Modbus, Profibus, Profinet or Modbus TCP type, using communication modalities of the "master-slave" type.

The system bus 11 is associated with a first user access level.

The communication network 1 also comprises a second communication bus 12 (the "switchboard bus"), designed to provide a second communication channel with the electronic protection device 2, and with its protection and control unit 21 in particular. The switchboard bus connects together the electronic devices for protecting the switchboard 50, such as the devices 2 and 2C.

Thanks to the switchboard bus 12, these devices can also be advantageously placed in communication with external electronic protection devices 2A, 2B, such as those belonging to switchboards designed to manage other sections of the electrical network. At least one electronic supervision and control device 70, such as a SCADA ("Supervisory Control And Data Acquisition") system, and one or more peripheral electronic devices 90, can be advantageously connected to the second communication bus so as to communicate with the protection and control units of the devices connected to the switchboard bus 12.

The switchboard bus 12 is associated with a second user access level, that is different and higher than the first user access level of the system bus 11.

The term "higher access level" is used here to mean that access to the switchboard bus 12 is reserved for a more limited number of operators than the system bus 11.

For instance, it may be advantageous to allow only "privileged" parties access to the switchboard first 12, i.e. those who can take higher priority action, such as the specialist personnel qualified to handle the so-called "servicing" of the switchboard.

Normal users of the switchboard 50°, or of the corresponding section of the electrical system, may not be allowed to access the switchboard bus 12, while they can communicate with the corresponding electronic protection devices through the system bus 11.

As a consequence of these differentiated user access levels, the system bus 11 can be used to access a more limited set of data/information 101 than the set of data/information 102 available via the second communication bus 102.

To prevent any unauthorized accesses, an electronic access control device 80 can be advantageously connected to the switchboard bus 12.

The switchboard bus 12 preferably implements a communication protocol of the Fieldbus type, such as Can, or Ethernet.

The preferred communication modalities in the switchboard bus 12 are of the "multi-master" type.

According to these communication modalities, the initiative for communication can be taken either by any of the electronic protection devices or other electronic devices operatively connected to the switchboard bus 12.

The communication network 1 comprises a third communication bus 13 (the "local bus"), designed to provide a third communication channel between the protection and control unit 21 and one or more additional electronic modules 6A, 6B, 6C, 6E, 6F.

These additional electronic modules can also be outside the electronic protection device 2 (like the module 6C, for instance).

The above-mentioned additional modules can comprise, for example, electronic devices of analog or digital type, suitable for expanding the inputs/outputs of the protection and control unit 21, electronic devices intended to provide auxiliary interfaces for the protection and control unit 21 (such as a display or a LED interface) and/or electronic devices designed to potentiate/expand the functions of the protection and control unit 21.

The above-mentioned additional modules advantageously also comprise communication modules that provide an interface towards the system bus 11, or the switchboard bus 12.

In fact, the electronic protection device 2 preferably comprises at least a first electronic communication module 6F, operatively connected between the system bus 11 and the local bus 13.

The module 6F is connected to the protection and control unit 21 by means of the local bus 13 and is advantageously capable of placing the protection and control unit 21 in communication with the system bus 11, whatever the communication protocol implemented by the latter.

The electronic protection device 2 preferably also comprises at least a second electronic communication module 6E, operatively connected between the switchboard bus 12 and the local bus 13.

The 6E is operatively connected to the protection and control unit 21 by means of the local bus 13 and is advantageously suitable for interfacing the protection and control unit 21 with the switchboard bus 12, whatever the communication protocol implemented by the latter.

The local bus 13 preferably implements a communication protocol of the Fieldbus type, such as Can.

The solution is particularly advantageous because several additional electronic modules (e.g. the communication modules 6B) can thus be operatively connected to one another so as to enable the expansion of the local bus 13 towards the next additional module, right up to the last additional module connected.

This makes it unnecessary to connect each additional module physically to the protection and control unit 21.

The use of Fieldbus communication protocols thus enables the layout of the local bus 13 to be varied according to need without having to take any action on the protection and control unit 21.

The communication modalities implemented in the local bus 13 are also preferably of the "multi-master" type, i.e. the initiative for communication can be taken by any of the additional electronic modules 6A-6FI operatively connected to the local bus 13.

The protection and control unit 21 and/or one or more of the additional electronic modules 6A-6F preferably comprise first computerized means 213 and/or second computerized means 64, respectively, for the automatic recognition of the additional electronic modules operatively connected to the local bus 13.

This solution is particularly advantageous because it makes it possible to connect different types of additional module to the local bus 13 (the only proviso consisting in that these modules be complete with a Fieldbus port) and enables the local bus 13 to be expanded without any conflicts.

In addition, this enables the additional modules to be connected to the local bus 13 according to a "plug and play" type of modality, avoiding the need for any preliminary configuration of the electronic devices connected to the local bus 13 every time an additional module is connected/disconnected.

Finally, the protection and control unit 21 can easily be programmed to memorized the configuration of the additional modules that come to bear on the local bus 13 at any given time, and to emit a signal whether or not this configuration is modified as a result of any failures and/or of the addition/removal of other modules.

It is clear from the above explanation that the communication network 1 according to the present invention offers considerable advantages over the known state of the art.

The system bus 11 can advantageously be used almost exclusively to perform simple monitoring and configuration procedures, e.g. to record the operating status of the electronic protection devices 2, 2A and 2C, or of the electrical lines in the switchboard, or to send signals to the electronic protection devices (e.g. signals for controlling, enabling, tripping, and so on) or data/information (e.g. operating parameters) to set/modify the operating configuration.

The switchboard bus 12 serves instead as an effective tool for implementing higher-level functions in an extremely flexible manner, with a considerable reduction in the wiring of the switchboard and of the installation times/costs.

The supervision and control unit 70 can be used to view data and parameters relating to all the electronic protection devices operatively connected to the switchboard bus 12.

It thus becomes possible to monitor the whole network of electronic protection devices by taking action from a single station and without any burden on the system bus 11, which is left fully available to the user of the switchboard or of the corresponding section of electrical installation.

The switchboard bus 12 enables a considerable sharing of the information input/output to the protection and control units of the electronic protection devices connected thereto.

As a result, a shared installation automation logic can easily be implemented in the devices that are interfaced with the switchboard bus 12, thereby further reducing the burden of any additional tasks on each electronic protection device.

It is also possible to provide one or more additional modules, such as the module 6C, to perform protection functions based on information drawn from other electronic protection devices too.

The switchboard bus 12 can be used, moreover, to exchange information relating to the electrical loads managed by the electronic protection devices in order to enable the implementation of "energy management" algorithms.

Such algorithms can be implemented both inside the additional modules and in the protection and control units of the devices connected to the switchboard bus 12, and they enable the user to achieve a controlled disconnection of the loads in the event of overloads by tripping the corresponding circuit breakers on the basis of previously-established operating parameters, such as the priority of the electrical load to protect, the current passing through the electrical load, the effect of circuit breaking for the purposes of solving the overload situation.

The continuity of the high-priority electrical line can thus be assured with the least possible overall impact on the section of electrical network managed by the electronic protection devices connected to the switchboard bus 12.

The communication network 1 enables a high level of selectivity to be assured between two or more electronic protection devices in a far more flexible manner than with the solutions of the known state of the art.

All the protection and control units connected to the switchboard bus 12 can exchange information relating to the protection logic they implement.

This makes it possible to use an extremely articulated and flexible logic in the selection of the action to take, thereby ensuring a very high performance without any need for modifications to the wiring of the system.

Thanks to the use of the switchboard bus 12, a local web server can be made available and used to record measurements and set the parameters of the protection and control units, of any respective additional interfacing modules, and of all other additional modules included in an electronic protection device operatively connected to the communication bus 12.

The switchboard bus 12 also offers considerable advantages when it comes to performing the so-called "network servicing" measures, since it becomes possible to manage the secure access to confidential data relating to the diagnostics of the electronic protection devices so that servicing measures of a predictive type can also be undertaken.

From the above description it is clear that the communication network according to the Present invention is characterized by a marked flexibility in use (from both the structural and the functional standpoints) combined with a straightforward physical structure, and a quick and flexible preparation/installation at relatively limited costs.

The communication network thus conceived according to the present invention may undergo numerous modifications and variants, all coming within the scope of the inventive concept; moreover, all the details may be replaced by others that are technically equivalent.

The invention claimed is:

1. A communication network for a low-voltage switchboard, said switchboard comprising at least one electrical switching device and at least one or more electronic protection device operatively connected to said electrical switching device, each said electronic protection device comprising a single protection and control unit, wherein the communications network comprises:

a first communication bus, designed to provide a first communication channel with said electronic protection device, and having a first user access level; and a second communication bus, designed to provide a second communication channel with said electronic protection device, said second communication bus being adapted to put in communication the protection and control unit of different ones of the electronic protection devices to perform automation and coordination functions, and having a second user access level, said second user access level being higher than said first user access level; and a third communication bus, designed to provide a third communication channel between said one protection and control unit and one or more additional electronic modules, said third communication bus forming the only communication bus which the protection and control unit of each electronic protection can reach the first or second communications buses;

wherein the first and second buses can only communicate through the third bus.

2. A communication network according to claim 1, wherein said at least one electronic protection device comprises at least a first electronic communication module operatively connected between said first communication bus and said third communication bus, said first electronic communication module being operatively connected to said at least one protection and control unit by means of said third communication bus.

3. A communication network according to claim 2, wherein said protection and control unit comprises first computerized means for the automatic recognition of the additional electronic modules operatively connected to said third communication bus.

4. A communication network according to claim 2, wherein at least one of said additional electronic modules comprises second computerized means for automatically recognizing the additional electronic modules operatively connected to said third communication bus.

5. A communication network according to claim 2, wherein at least one supervision and control device is operatively connected to said second communication bus.

6. A communication network according to claim 1, wherein said at least one electronic protection device comprises at least a second electronic communication module operatively connected between said second communication bus and said third communication bus, said second electronic communication module being operatively connected to said at least one protection and control unit by means of said third communication bus.

7. A communication network according to claim 6, wherein said protection and control unit comprises first computerized means for the automatic recognition of the additional electronic modules operatively connected to said third communication bus.

8. A communication network according to claim 6, wherein at least one of said additional electronic modules comprises second computerized means for automatically recognizing the additional electronic modules operatively connected to said third communication bus.

9. A communication network according to claim 1, wherein said protection and control unit comprises first computerized means for the automatic recognition of the additional electronic modules operatively connected to said third communication bus.

10. A communication network according to claim 9, wherein at least one of said additional electronic modules comprises second computerized means for automatically recognizing the additional electronic modules operatively connected to said third communication bus.

11. A communication network according to claim 1, wherein at least one of said additional electronic modules comprises second computerized means for automatically recognizing the additional electronic modules operatively connected to said third communication bus.

12. A communication network according to claim 1, wherein at least one supervision and control device is operatively connected to said second communication bus.

13. A communication network according to claim 1, wherein at least one peripheral electronic device is operatively connected to said second communication bus.

14. A communication network according to claim 1, wherein at least one electronic access control device is operatively connected to said second communication bus.

15. A communication network according to claim 1, wherein said first communication bus implements a communication protocol of the Modbus, Profibus, or Profmet type.

16. A communication network according to claim 1, wherein said second communication bus implements a communication protocol of the Fieldbus or Ethernet type.

17. A communication network according to claim 1, wherein said third communication bus implements a communication protocol of the Fieldbus type.

18. A communication network according to claim 1, wherein said first communication bus can be used to access a first previously-established set of data and information, said first previously-established set of data and information-being more limited than a second set of data and information that can be accessed by means of said second communication bus.

19. A communication network according to claim 1, wherein said second communication bus, said third communication bus, or said second communication bus and said third communication bus, implement communication modalities of the multi-master type.

20. A low-voltage switchboard wherein it comprises a communication network according to claim 1.

* * * * *